United States Patent
Zhao

(10) Patent No.: US 10,268,371 B2
(45) Date of Patent: Apr. 23, 2019

(54) METHOD, DEVICE AND STORAGE MEDIUM FOR INPUTTING CHARACTERS

(71) Applicant: Xiaomi Inc., Beijing (CN)

(72) Inventor: Fei Zhao, Beijing (CN)

(73) Assignee: XIAOMI INC., Haidian District, Beijing ( * ) Notice: Subject to any disclaimer, the term of this patent is extended or adjusted under 35 U.S.C. 154(b) by 227 days.

(21) Appl. No.: 15/190,151

(22) Filed: Jun. 22, 2016

(65) Prior Publication Data

US 2016/0378335 A1    Dec. 29, 2016

(30) Foreign Application Priority Data

Jun. 26, 2015  (CN) .......................... 2015 1 0364420

(51) Int. Cl.
*G06F 3/048*    (2013.01)
*G06F 3/0488*    (2013.01)
(Continued)

(52) U.S. Cl.
CPC ........ *G06F 3/04886* (2013.01); *G06F 3/0418* (2013.01); *G06F 3/0482* (2013.01);
(Continued)

(58) Field of Classification Search
CPC .......................... G06F 3/0488; G06F 3/04886
See application file for complete search history.

(56) References Cited

U.S. PATENT DOCUMENTS 5,215,388 A * 6/1993 Shibaoka .............. B41J 5/30
     400/63
5,828,783 A * 10/1998 Ishigaki ............... G06K 9/222
     382/186
(Continued)

FOREIGN PATENT DOCUMENTS

CN     1619585 A    5/2005
CN     1731331 A    2/2006
(Continued)

OTHER PUBLICATIONS

JP2001175375A machine translation, pp. 1-6 http://translationportal.epo.org.*
(Continued)

*Primary Examiner* — Scott T Baderman
*Assistant Examiner* — Mario M Velez-Lopez
(74) *Attorney, Agent, or Firm* — Jun He Law Offices P.C.; James J. Zhu

(57) ABSTRACT

A method, device and storage medium for inputting characters are provided. The method includes: presenting a user interface on the touch screen, the user interface comprising a soft keyboard; identifying a location of a first touch point upon detection of a first touch acted on the soft keyboard; judging, based on the location of the first touch point, whether it is needed to select a plurality of candidate characters from the soft keyboard; when it is needed to select the plurality of candidate characters, presenting the plurality of candidate characters on a currently provided user interface, wherein a first area occupied by each of the candidate characters on the currently provided user interface is larger than a second area occupied by each of the candidate characters on the soft keyboard; and determining a target character from the plurality of candidate characters.

16 Claims, 9 Drawing Sheets

(51) Int. Cl.
*G06F 3/041* (2006.01)
*G06F 3/0482* (2013.01)
*G06F 3/0489* (2013.01)
*G06T 11/60* (2006.01)
*G09G 5/10* (2006.01)

(52) U.S. Cl.
CPC ...... *G06F 3/04883* (2013.01); *G06F 3/04895* (2013.01); *G06T 11/60* (2013.01); *G09G 5/10* (2013.01); *G06F 2203/04805* (2013.01); *G09G 2320/0606* (2013.01); *G09G 2320/0613* (2013.01)

(56) References Cited

U.S. PATENT DOCUMENTS

| | | | | |
|---|---|---|---|---|
| 6,107,994 | A * | 8/2000 | Harada | G06F 3/04886 345/168 |
| 8,930,813 | B2 * | 1/2015 | McMaster | G06F 17/2264 715/256 |
| 2006/0161846 | A1 | 7/2006 | Van Leeuwen | |
| 2009/0174667 | A1 * | 7/2009 | Kocienda | G06F 3/0237 345/169 |
| 2010/0066695 | A1 | 3/2010 | Miyazaki | |
| 2010/0228539 | A1 * | 9/2010 | Slocum | G06F 3/04886 704/9 |
| 2011/0080345 | A1 * | 4/2011 | Jun | G06F 3/0235 345/169 |
| 2011/0242137 | A1 * | 10/2011 | Lee | G06F 3/04886 345/660 |
| 2013/0076669 | A1 | 3/2013 | Ando | |
| 2013/0187858 | A1 * | 7/2013 | Griffin | G06F 3/0237 345/168 |
| 2013/0271379 | A1 | 10/2013 | Ide | |
| 2014/0049499 | A1 * | 2/2014 | Huck | G06F 3/0416 345/173 |

FOREIGN PATENT DOCUMENTS

| | | | |
|---|---|---|---|
| CN | 101968711 | * | 2/2011 |
| CN | 101968711 | A | 2/2011 |
| CN | 104898889 | A | 9/2015 |
| JP | 2001175375 | A | 6/2001 |
| JP | 2011210083 | A | 10/2011 |
| JP | 2011216094 | A | 10/2011 |
| JP | 2014075004 | A | 4/2014 |
| JP | 2014086936 | A | 5/2014 |
| JP | 2015032016 | A | 2/2015 |
| KR | 20150079838 | A | 7/2015 |
| RU | 2501068 | C2 | 12/2013 |
| WO | 2012086133 | A1 | 6/2012 |

OTHER PUBLICATIONS

International Search Report for PCT/CN2015/095163.
Extended European Search Report for European application No. 16175844.6, dated Oct. 25, 2016.
International Search Report for International application No. PCT/CN2015/095163, dated Apr. 1, 2016.

* cited by examiner

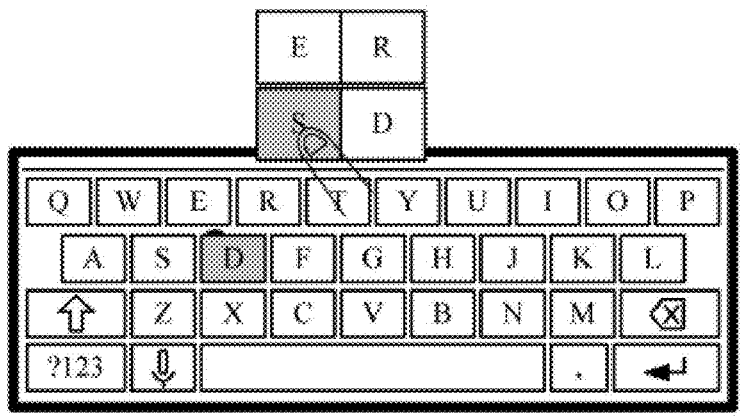

Fig. 2F

```
┌─────────────────────────────────────────────────┐
│ Determine at least one second candidate character based on at  │
│ least one second distance in an ascending order, the second    │──301
│ distance referring to a distance between a center point of a   │
│ second region where each of the at least one second candidate  │
│ character is located and the first touch point                 │
└─────────────────────────────────────────────────┘
                          │
                          ▼
┌─────────────────────────────────────────────────┐
│ Present the first candidate character and the at least one     │──302
│ second candidate character on the provided small keyboard      │
└─────────────────────────────────────────────────┘
```

Fig. 3

```
┌─────────────────────────────────────────────────┐
│ When a second touch is detected on the plurality of candidate  │
│ characters, determine second touch point coordinates of a      │──401
│ second location where the second touch point is located        │
└─────────────────────────────────────────────────┘
                          │
                          ▼
┌─────────────────────────────────────────────────┐
│ Determine the target character according to the second touch   │──402
│ point coordinates, the second touch point being located within │
│ a target region where the target character is located          │
└─────────────────────────────────────────────────┘
```

Fig. 4

METHOD, DEVICE AND STORAGE MEDIUM FOR INPUTTING CHARACTERS

CROSS-REFERENCE TO RELATED APPLICATIONS

This application is based upon and claims priority to Chinese Patent Application No. 201510364420.2 filed on Jun. 26, 2015, the entire contents of which are incorporated herein by reference.

TECHNICAL FIELD

The present disclosure generally relates to communication technical field, and more particularly, to a method, device and storage medium for inputting characters.

BACKGROUND

When a user is entering characters on a terminal device with a touch screen, such as a mobile phone, in addition to the handwriting input, the user may enter characters through a soft keyboard in related arts. One of the biggest problems for soft keyboard is that the user cannot accurately select and input the desired character through the soft keyboard. Therefore, the character selected by the keyboard is usually a character around the target character instead of the target character itself, and thus the user has to try to enter the target character again.

The size of each key may be increased by enlarging the screen of the terminal device to improve input accuracy. However, the screen size of the terminal device is limited after all and different people have different finger sizes, thus the above problems can't be fundamentally solved by enlarging the screen of the terminal device.

SUMMARY

The present disclosure provides a method, device and storage medium for inputting characters.

According to a first aspect of embodiments of the present disclosure, there is provided a method for inputting characters. The method is implemented by a terminal device with a touch screen and includes: presenting a user interface on the touch screen, the user interface comprising a soft keyboard; identifying a location of a first touch point upon detection of a first touch acted on the soft keyboard; judging, based on the location of the first touch point, whether it is needed to select a plurality of candidate characters from the soft keyboard; when it is needed to select the plurality of candidate characters, presenting the plurality of candidate characters on a currently provided user interface, wherein a first area occupied by each of the candidate characters on the currently provided user interface is larger than a second area occupied by each of the candidate characters on the soft keyboard; and determining a target character from the plurality of candidate characters.

According to a second aspect of embodiments of the present disclosure, there is provided a device for inputting characters, including: a processor; a touch screen and a memory for storing instructions executable by the processor. The processor is configured to perform: presenting a user interface on the touch screen, the user interface comprising a soft keyboard; identifying a location of a first touch point upon detection of a first touch acted on the soft keyboard; judging, based on the location of the first touch point, whether it is needed to select a plurality of candidate characters from the soft keyboard; when it is needed to select the plurality of candidate characters, presenting the plurality of candidate characters on a currently provided user interface, wherein a first area occupied by each of the candidate characters on the currently provided user interface is larger than a second area occupied by each of the candidate characters on the soft keyboard; and determining a target character from the plurality of candidate characters.

According to a third aspect of embodiments of the present disclosure, there is provided a non-transitory computer-readable storage medium having stored therein instructions that, when executed by a processor of a terminal device with a touch screen, cause the terminal device to perform a method for inputting characters, the method including: presenting a user interface on the touch screen, the user interface comprising a soft keyboard; identifying a location of a first touch point upon detection of a first touch acted on the soft keyboard; judging, based on the location of the first touch point, whether it is needed to select a plurality of candidate characters from the soft keyboard; when it is needed to select the plurality of candidate characters, presenting the plurality of candidate characters on a currently provided user interface, wherein a first area occupied by each of the candidate characters on the currently provided user interface is larger than a second area occupied by each of the candidate characters on the soft keyboard; and determining a target character from the plurality of candidate characters.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 2F is a diagram showing another interface when candidate characters are presented on a small soft keyboard over a soft keyboard according to an exemplary embodiment of the present disclosure.

FIG. 3 is a flowchart showing another method for inputting characters according to an exemplary embodiment of the present disclosure.

FIG. 4 is a flowchart showing another method for inputting characters according to an exemplary embodiment of the present disclosure.

DETAILED DESCRIPTION

Figure 1:
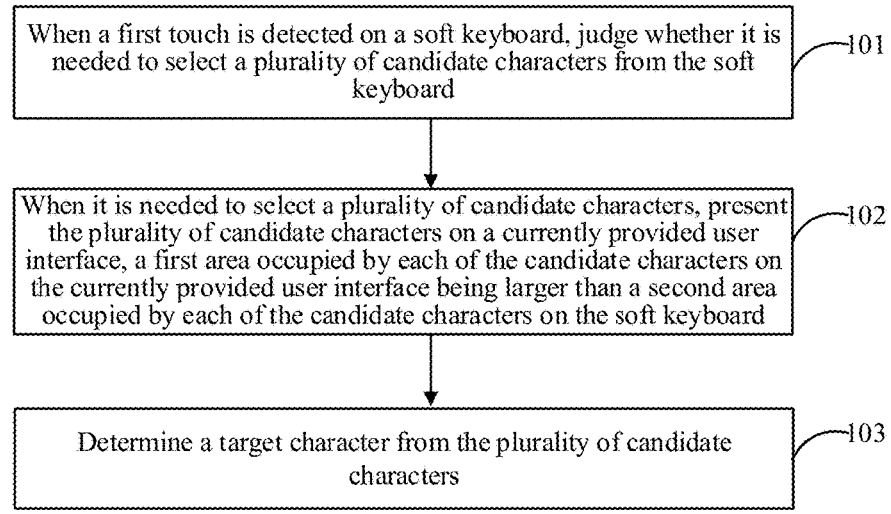
FIG. 1 is a flowchart showing a method for inputting characters according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The terminologies used herein are only for describing particular embodiments but not for limiting the present disclosure. The singular form words "a", "the", and "said" used in the present disclosure and appended claims are intended to include plural form, unless otherwise clearly stated. Also, it shall be appreciated that the terminology "and/or" used herein refers to any or all combinations of one or more listed related items.

It shall be appreciated that although the present disclosure uses terminologies "first", "second", and "third" and the like to describe various information, the information shall not be limited by these terminologies. Using these terminologies is only for distinguishing information of the same type. For example, without departing from the scope of the present disclosure, the first information may be referred to as the second information, and similarly, the second information may be referred to as the first information. Depending on the context, the terminology "if" used herein may be interpreted as "when" or "in response to determining that . . . ".

In the present disclosure, when a first touch is detected on a soft keyboard, whether it is needed to select a plurality of candidate characters from a soft keyboard is judged according to the location information of first touch point. When it is needed to present a plurality of candidate characters, the plurality of candidate characters with increased areas are output on the touchscreen. Thus, it is easy for a user to select a target character accurately among the plurality of candidate characters.

In the present disclosure, the terminal device can judge whether a first distance between the first center point coordinates of a center point of the first region where a first candidate character is located and the first touch point coordinates exceeds a preset threshold, thus the terminal device can intelligently determine whether to provide the plurality of candidate characters. Therefore the user only needs to confirm the target character among the provided plurality of candidate characters with increased areas. Thus, user experience is improved.

In the present disclosure, the plurality of candidate characters presented through a small soft keyboard include a first candidate character and at least one second candidate character. The first touch point are within a first region where the first candidate character is located, that is, the first candidate character is most likely to serve as the target character. Thus, the first candidate character may be highlighted by increasing the brightness value, and thereby user experience is improved. In addition to the first candidate character, the present disclosure also provides at least one character in the nearest proximities of the first touch point coordinates as the second candidate characters. Thus, the accuracy for determining the target character is improved.

In the present disclosure, after the plurality of candidate characters are provided, the target character may be determined in various manners. The target character may be determined according to a second touch detected on the candidate characters with increased areas. Alternatively, when information of consecutive touch points is detected, the target character is determined according to the information of the last touch point in the consecutive touch points. In this way, the user can accurately select the target character among the candidate characters, and thereby user experience is improved.

In the present disclosure, while providing the plurality of candidate characters, a character corresponding to a current touch point in the consecutive touch points may be highlighted by increasing the brightness value. Thus, the user may judge more accurately whether the character is the target character that the user wants and selects the target character accurately. In this way, the present disclosure may improve user experience.

FIG. 1 is a flowchart showing a method for inputting characters according to an exemplary embodiment. The method is implemented by a terminal device with a touch screen and includes the following steps.

In step 101, when a first touch is detected on a soft keyboard, whether it is needed to select a plurality of candidate characters from the soft keyboard is judged. Before this step, a user interface comprising a soft keyboard is presented in the touch screen. Moreover, a location of a first touch point is identified upon detection of the first touch acted on the soft keyboard.

The terminal device involved in embodiments of the present disclosure may be various smart terminal devices with a touch screen on which touch operations may be performed, for example, a smart phone, a tablet computer, a Personal Digital Assistant (PDA) and the like. Alternatively, the terminal device may be a terminal device having a relatively small touch screen.

In this step, when a user of the terminal device taps a soft keyboard through the touch screen, the terminal device can detect a first touch. At this time, related technologies may be used to determine first touch point coordinates of a location where the first touch point is located. A character corresponding to the region where the first touch point is located is determined as a first candidate character.

Optionally, in an embodiment of the present disclosure, whether a first distance between first center point coordinates of a center point of a first region and the first touch point coordinates exceeds a preset threshold is judged to decide whether to provide a plurality of candidate characters.

When the first distance does not exceed the preset threshold, it can be determined that the first touch point is located relatively centrally in the first region, and thus it can be determined that the target character that the user wants is the first candidate character, and the first candidate character can be directly returned on the soft keyboard.

When the first distance exceeds the preset threshold, it can be determined that the first touch point is at an edge location of the first region. Because the area occupied by each of the characters on the soft keyboard is relatively small, if the first character is directly determined as the target character, this may cause the user to reselect characters. In an embodiment of the present disclosure, under such situation, it is determined that a plurality of candidate characters need to be provided so as to allow the user to select the target character more accurately.

In step 102, when it is needed to select a plurality of candidate characters, the plurality of candidate characters are presented on a currently provided user interface. A first area currently occupied by each of the candidate characters on the currently provided user interface is larger than a second area occupied by each of the candidate characters on the soft keyboard.

In this step, a small soft keyboard may be provided as the currently provided user interface, and the plurality of candidate characters may be output on the small soft keyboard. The small soft keyboard may be located at any side of the soft keyboard, for example, the small soft keyboard may be located at the upper-left, the bottom-left, the upper-right, or the bottom-right and the like of the soft keyboard. Meanwhile, the small soft keyboard may cover a part of the soft keyboard.

The plurality of candidate characters output on the small soft keyboard include a first candidate character and at least one second candidate character.

The first candidate character is a character corresponding to the information of the first touch point, and is most likely to serve as the target character. Thus, in an embodiment of the present disclosure, a first brightness value of the first candidate character may be increased to highlight the first candidate character, and thereby user experience is improved.

In this step, while the first candidate character is output, at least one second candidate character may be output according to the first touch point coordinates. The at least one second candidate character may be one or more characters determined according to at least one second distance in an order from small to large, wherein the second distance refers to a distance between a center point of a second region where each of the at least one second candidate character is located and the first touch point coordinates. Thus, the target character can be determined more accurately. Optionally, three second candidate characters may be output.

In an embodiment of the present disclosure, because the number of the candidate characters output on the small soft keyboard is relatively small, the first area currently occupied by each of the candidate characters (i.e., the first area occupied by each of the candidate characters on the small soft keyboard) may be larger than the second area occupied by each of the candidate characters on the soft keyboard. Thus, the user may determine the target character more accurately on the small soft keyboard because the area of each of the candidate characters is increased, and thereby user experience is improved.

In step 103, the target character is determined from the plurality of candidate characters.

In this step, one optional implementation is that, when it is detected that a second touch is acted on the plurality of candidate characters through the small soft keyboard, second touch point coordinates of the second touch point are firstly determined, and a character corresponding to the region where the second touch point is located is determined as the target character.

Another optional implementation is that, when consecutive touches are detected on the plurality of candidate characters, for example, consecutive touch points generated when a stylus or a finger of the user of the terminal device always is in contact with the touch screen and slides thereon, third touch point coordinates of a last touch point in the consecutive touch points is located are determined from the plurality of candidate characters. At this time, the information of the last touch point corresponds to the information of the touch point where the user lifts the stylus or finger. A character corresponding to the region where the third touch point is located is determined as the target character.

Optionally, among the plurality of candidate characters, a second brightness value of a character corresponding to a current touch point in the consecutive touch points may be increased to allow the user to determine whether the currently highlighted character is the target character that the user wants more accurately, and thereby user experience is improved.

After the target character is determined by the above steps, optionally, the method further includes: presenting the target character in a text entry area as an inputted character.

It can be seen from the above embodiments that, when the information of the first touch point is detected on the soft keyboard, the terminal device intelligently judges, according to the information of the first touch point, whether the location where the first touch point is located is at a relatively central region of the first candidate character so as to determine whether to provide a plurality of candidate characters. When it is needed to provide the plurality of candidate characters, the plurality of candidate characters are output on a provided small soft keyboard on which the area of each of the candidate characters is increased. Thus, it is easy for the user to select the target character from the plurality of candidate characters accurately, and thereby user experience is improved.

By the above procedures, the present disclosure may avoid the problem that, when the user enters characters on the soft keyboard of the touch screen of the terminal device, the user cannot select the target character accurately and thereby has to retap the soft keyboard to enter the character again.

Figure 2A:
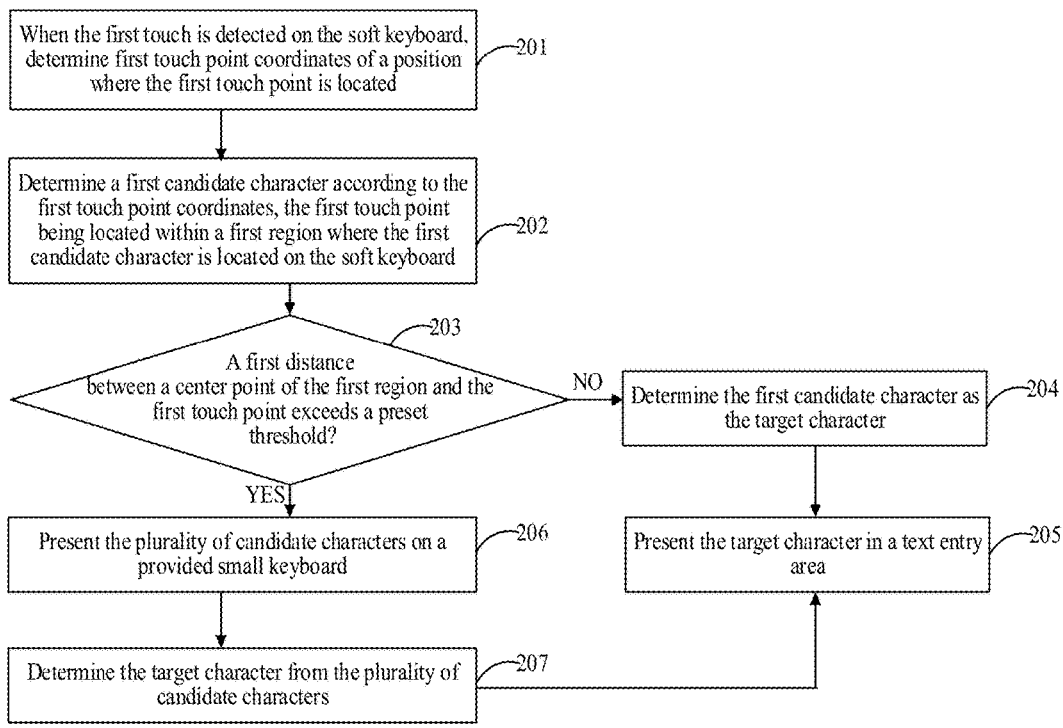
FIG. 2A is a flowchart showing another method for inputting characters according to an exemplary embodiment of the present disclosure.

FIG. 2A is a flowchart showing another method for inputting characters according to an exemplary embodiment. The method may be implemented by a terminal device with a touch screen and may include the following steps.

In step 201, when a first touch is detected on a soft keyboard, first touch point coordinates of a first touch point are determined. The first touch point coordinates indicate the location of the first touch point on the touch screen.

Figure 2B:
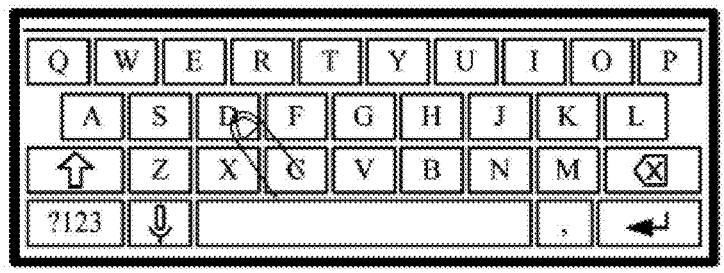
FIG. 2B is a diagram showing an interface for presenting characters on a soft keyboard according to an exemplary embodiment of the present disclosure.

In this step, when a user of the terminal device taps a certain character on the soft keyboard via his/her finger or stylus, as shown in FIG. 2B, the terminal device may detect the information of the first touch point on the soft keyboard and may determine the first touch point coordinates through the technologies in related arts.

In step 202, a first candidate character is determined according to the first touch point coordinates. The first touch point is located within a first region where the first candidate character is located on the soft keyboard.

In this step, a character corresponding to the region where the first touch point is located is determined as the first candidate character. As shown in FIG. 2B, the first touch point is fallen within the region where the character "D" is located, the character "D" is determined as the first candidate character.

In step 203, whether a first distance between first center point coordinates of a center point of the first region and the first touch point coordinates exceeds a preset threshold is judged. If the first distance does not exceed the preset threshold, step 204 is performed; otherwise, step 206 is performed.

Figure 2C:
FIG. 2C is a diagram showing an interface when a character on a soft keyboard is tapped according to an exemplary embodiment of the present disclosure.

In this step, by judging whether the first distance exceeds the preset threshold, whether the first touch point is located relatively centrally in the first region is determined. As shown in FIG. 2C, the above judging corresponds to judging whether the first touch point is located in a region with the center point of the region where the character "D" is located as the circle center and the preset threshold as the radius. If the first touch point is fallen within the region, it is indicated that the first touch point is located relatively centrally in the first region, and then step 204 may be performed. Otherwise, step 206 is performed.

In step 204, the first candidate character is determined as the target character.

If the first touch point is located relatively centrally in the first region, the first candidate character can be determined as the target character that the user wants.

In step 205, the target character is presented in a text entry area as an inputted character.

In step 206, the plurality of candidate characters are presented on a provided small soft keyboard.

In this step, when the first distance exceeds the preset threshold, it is indicated that the first touch point is located at an edge location of the first region, and at this time a small soft keyboard can be provided, and the candidate characters can be presented on the small soft keyboard. The small soft keyboard may be located at any side of the soft keyboard, for example, the small soft keyboard may be located in the upper-left, the bottom-left, the upper-right, or the bottom-right and the like of the soft keyboard. Meanwhile, the small soft keyboard may cover a part of the soft keyboard.

The presented plurality of candidate characters include the first candidate character and at least one second candidate character. The at least one second candidate character refers to at least one character in the nearest proximity of the first touch point coordinates. In an embodiment of the present disclosure, at least one second distance between second center point coordinates of a center point of a second region where each of the at least one second candidate character is located and the first touch point coordinates is calculated, and at least one second candidate character may be selected based on the corresponding calculated distance. Optionally, the top three characters with the calculated distance in ascending order may be sequentially selected as the second candidate characters.

Because the number of the characters provided on the small soft keyboard is relatively small, the first area currently occupied by each of the candidate characters on the small soft keyboard may be larger than the second area occupied by each of the candidate characters on the soft keyboard.

Figure 2D:
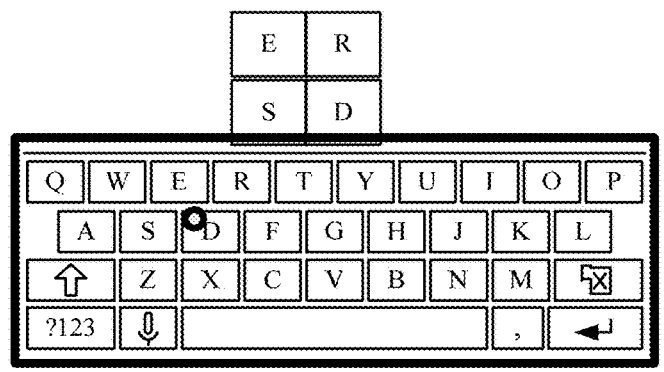
FIG. 2D is a diagram showing an interface when candidate characters are presented on a small soft keyboard over a soft keyboard according to an exemplary embodiment of the present disclosure.

As shown in FIG. 2D, when the first touch point is at an edge location of the character "D", for example, at the upper-left location, three second candidate characters in the nearest proximity of the first touch point is provided on the small soft keyboard in addition to the first candidate character "D", i.e., the characters "S", "E" and "R" at the upper-left location with respect to the character "D" on the soft keyboard.

Figure 2E:
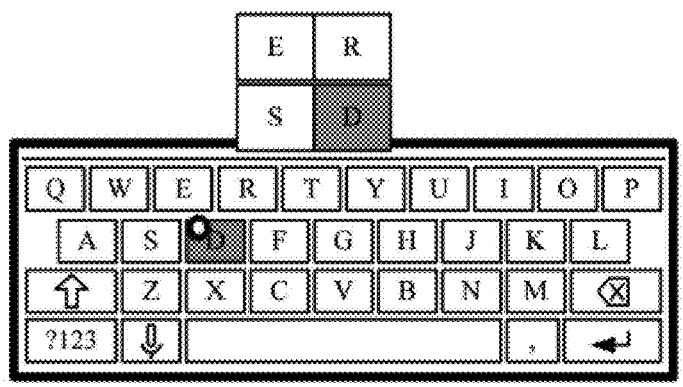
FIG. 2E is a diagram showing another interface when candidate characters are presented on a small soft keyboard over a soft keyboard according to an exemplary embodiment of the present disclosure.

In this step, the first candidate character is a character corresponding to the information of the first touch point, and is also most likely to serve as the target character. Thus, in an embodiment of the present disclosure, while a plurality of candidate characters are presented on the small soft keyboard, the first brightness value of the first candidate character may be increased to highlight the first candidate character, and thereby user experience is improved, as shown in FIG. 2E.

In step 207, the target character is determined from the plurality of candidate characters. In the step, the target character may be determined by the following approaches:

Approach One: When a second touch is detected on the plurality of candidate characters, second touch point coordinates of a location where the second touch point is located are firstly determined, and a character corresponding to the region where the second touch point is located is determined as the target character.

That is to say, the user of the terminal device may directly tap the target character on the small soft keyboard. Because the area occupied by each character is increased on the small soft keyboard, the user can determine the target character more accurately, and thereby user experience is improved.

Approach Two: When information of consecutive touch points is detected, third touch point coordinates of a location where the last touch point in the consecutive touch points is located are determined from the plurality of candidate characters, and a character corresponding to the region where the third touch point is located is determined as the target character.

When information of consecutive touch points is detected, for example, the information of consecutive touch points generated when a stylus or a finger of the user of the terminal device always is in contact with the touch screen and slides thereon, the information of the last touch point corresponds to the information of the touch point where the user lifts the stylus or finger, and a character corresponding to the information of the last touch point is determined as the target character.

Optionally, a second brightness value of a character corresponding to information of a current touch point in the consecutive touch points may be increased to allow the user to determine whether the currently highlighted character is the target character that the user wants more accurately, and thereby user experience is improved. As shown in FIG. 2F, when user's finger is in contact with the touch screen and slides to the character "S" on the small soft keyboard, the brightness value of the character "S" is increased.

After the target character is determined from the plurality of candidate characters, return back to step 205.

Apparently, from the above embodiments, in the present disclosure, when a first touch is detected on a soft keyboard, the terminal device judges whether a first distance between first center point coordinates of a center point of the first region where a first candidate character is located and the first touch point coordinates exceeds a preset threshold, and thus the terminal device can judge whether to provide the plurality of candidate characters intelligently. When it needs to provide a plurality of candidate characters, the plurality of candidate characters with increased areas are presented. In the embodiments of the present disclosure, the presented candidate characters include a first candidate character and at least one second candidate character in the nearest proximity of the first touch point coordinates, and thus it is easy for the user to select the target character from the presented plurality of candidate characters accurately. In the present disclosure, the user only needs to confirm the target character from the provided plurality of candidate characters with increased areas. Thus, user experience is improved.

FIG. 3 is a flowchart showing another method for inputting characters according to an exemplary embodiment. The method is implemented by a terminal device with a touch screen. On the basis of the embodiment shown in FIG. 2A, the embodiment in FIG. 3 describes the procedure for presenting a plurality of candidate characters on a provided small soft keyboard in detail, and may include the following steps.

In step 301, at least one second candidate character is determined based on at least one second distance in an ascending order. The second distance refers to a distance between a center point of a second region where each of the at least one second candidate character is located and the first touch point coordinates.

In this step, at least one second distance between the center point of a second region where each of the at least one second candidate character is located and the first touch point coordinates is calculated, and at least one second candidate character may be selected according to the corresponding calculated distance. Optionally, the top three characters with calculated distance in an ascending order may be sequentially selected as the second candidate characters.

In step 302, the first candidate character and the at least one second candidate character are presented on the provided small soft keyboard.

Because the number of the characters provided on the small soft keyboard is relatively small, the first area currently occupied by each of the candidate characters on the small soft keyboard may be larger than the second area occupied by each of the candidate characters on the soft keyboard.

FIG. 4 is a flowchart showing another method for inputting characters according to an exemplary embodiment. The method is implemented by a terminal device with a touch screen. On the basis of the embodiment shown in FIG. 2A, the embodiment in FIG. 4 describes the procedure for determining a target character from a plurality of candidate characters in detail, and may include the following steps.

In step 401, when a second touch is detected on the plurality of candidate characters, second touch point coordinates of a location where the second touch point is located are determined.

In this step, because the area occupied by each character is increased on the small soft keyboard, the user can tap the target character on the small soft keyboard directly and more accurately.

In step 402, the target character is determined according to the second touch point coordinates. The second touch point is located within a target region where the target character is located.

Figure 5:
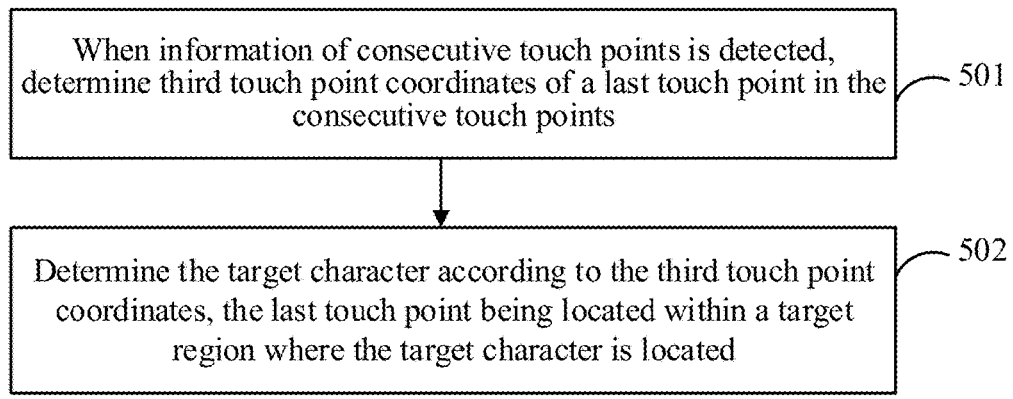
FIG. 5 is a flowchart showing another method for inputting characters according to an exemplary embodiment of the present disclosure.

FIG. 5 is a flowchart showing another method for inputting characters according to an exemplary embodiment. The method is implemented by a terminal device with a touch screen. On the basis of the embodiment shown in FIG. 2A, the embodiment in FIG. 5 describes the procedure for determining a target character from a plurality of candidate characters in detail, and may include the following steps.

In step 501, when information of consecutive touch points is detected, the third touch point coordinates of a location where the last touch point in the consecutive touch points is located are determined among the plurality of candidate characters.

In step 502, the target character is determined according to the third touch point coordinates. The last touch point is located within a target region where the target character is located.

In the above embodiment, when information of consecutive touch points is detected by a terminal device, for example, the information of consecutive touch points generated when a stylus or a finger of the user of the terminal device is in contact with the touch screen and slides thereon, the information of the last touch point corresponds to the information of the touch point where the user lifts the stylus or finger. A character corresponding to the region where the third touch point coordinates of the location where the last touch point is located is determined as the target character.

Corresponding to the above embodiments of the method for inputting characters, the present disclosure also provides the embodiment of a device for inputting characters.

Figure 6:
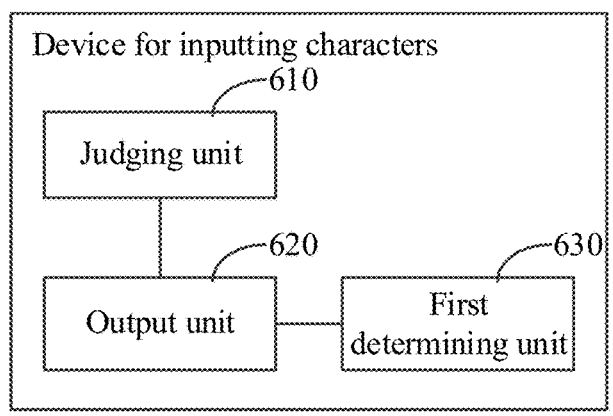
FIG. 6 is a block diagram showing a device for inputting characters according to an exemplary embodiment of the present disclosure.

FIG. 6 is a block diagram showing a device for inputting characters according to an exemplary embodiment of the present disclosure. The device includes a judging unit 610, an output unit 620 and a first determining unit 630.

The judging unit 610 is configured to judge whether it is needed to provide a plurality of candidate characters, when the first touch is detected on a soft keyboard.

The output unit 620 is configured to present the plurality of candidate characters, when it is needed to provide a plurality of candidate characters. A first area currently occupied by each of the candidate characters is larger than a second area occupied by each of the candidate characters on the soft keyboard.

The first determining unit 630 is configured to determine a target character from the plurality of candidate characters.

In the above embodiment, when a tap instruction of tapping a soft keyboard is received, whether it is needed to provide a plurality of candidate characters is judged according to the tap instruction. When it is needed to provide a plurality of candidate characters, the plurality of candidate characters with increased areas are presented. Thus, it is easy for a user to select a target character from the provided plurality of candidate characters accurately.

Figure 7:
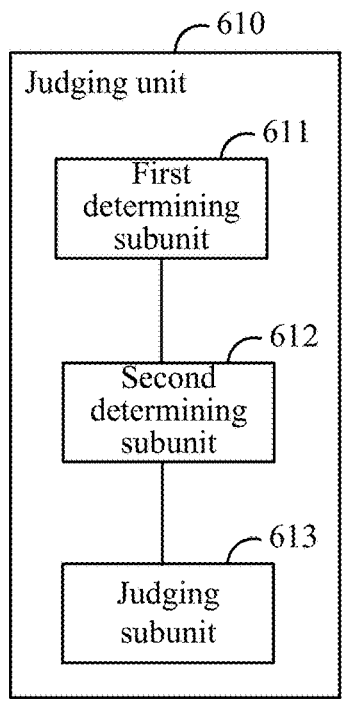
FIG. 7 is a block diagram showing another device for inputting characters according to an exemplary embodiment of the present disclosure.

FIG. 7 is a block diagram showing another device for inputting characters according to an exemplary embodiment of the present disclosure. On the basis of the embodiment shown in FIG. 6, the judging unit 610 in the embodiment shown in FIG. 7 includes a first determining subunit 611, a second determining subunit 612 and a judging subunit 613.

The first determining subunit 611 is configured to determine the first touch point coordinates of a location where the first touch point is located, when the information of the first touch point is detected on the soft keyboard.

The second determining subunit 612 is configured to determine a first candidate character according to the first touch point coordinates. The first touch point is located within a first region where the first candidate character is located on the soft keyboard.

The judging subunit 613 is configured to judge whether a first distance between first center point coordinates of a center point of the first region and the first touch point coordinates exceeds a preset threshold, and determine that it is needed to provide the plurality of candidate characters when the first distance exceeds the preset threshold.

In the above embodiment, the terminal device can judge whether to provide the plurality of candidate characters according to the first touch point coordinates intelligently, and thereby user experience is improved.

Figure 8:
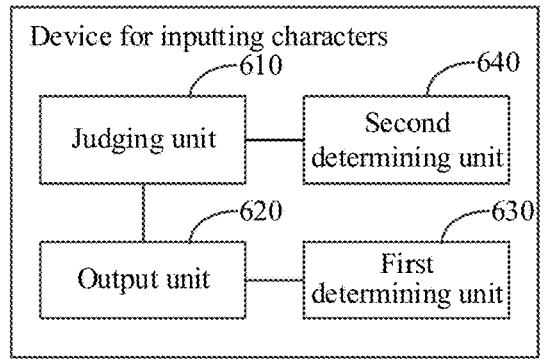
FIG. 8 is a block diagram showing another device for inputting characters according to an exemplary embodiment of the present disclosure.

FIG. 8 is a block diagram showing another device for inputting characters according to an exemplary embodiment of the present disclosure. On the basis of the embodiment shown in FIG. 7, the device in the embodiment shown in FIG. 8 further includes a second determining unit 640.

The second determining unit 640 is configured to determine the first candidate character as the target character, when the first distance does not exceed the preset threshold.

In the above embodiment, when it is not needed to provide the plurality of candidate characters, the terminal device automatically determines the first candidate character as the target character, and thus user experience is also improved.

Figure 9:
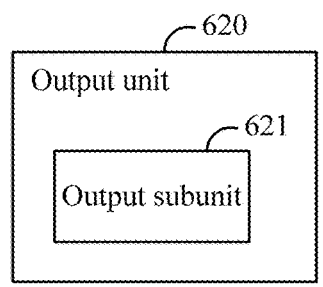
FIG. 9 is a block diagram showing another device for inputting characters according to an exemplary embodiment of the present disclosure.

FIG. 9 is a block diagram showing another device for inputting characters according to an exemplary embodiment of the present disclosure. On the basis of the embodiment shown in FIG. 7, the output unit 620 in the embodiment in FIG. 9 includes an output subunit 621.

The output subunit 621 is configured to present the plurality of candidate characters on a provided small soft keyboard.

In the above embodiment, a small soft keyboard is provided over the soft keyboard, and the plurality of candidate characters are presented on the small soft keyboard. Because the number of the characters output on the small soft keyboard is relatively small, the area occupied by each candidate character can be increased. Thus, the user may accurately select the target character on the small soft keyboard.

Figure 10:
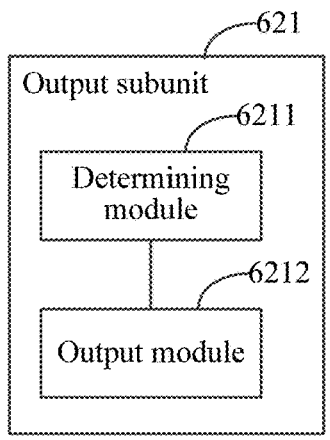
FIG. 10 is a block diagram showing another device for inputting characters according to an exemplary embodiment of the present disclosure.

FIG. 10 is a block diagram showing another device for inputting characters according to an exemplary embodiment of the present disclosure. On the basis of the embodiment shown in FIG. 9, the output subunit 621 in the embodiment in FIG. 10 includes a determining module 6211 and an output module 6212.

The determining module 6211 is configured to determine at least one second candidate character based on at least one second distance in an ascending order. The second distance refers to a distance between the second center point coordinates of a center point of a second region where each of the at least one second candidate character is located and the first touch point coordinates.

The output module 6212 is configured to output the first candidate character and at least one second candidate character on the provided small soft keyboard.

In the above embodiment, at least one character (i.e., at least one second candidate character) in the nearest proximity of the first touch point coordinates are output on the small soft keyboard in addition to the first candidate character. In the embodiment of the present disclosure, at least one second distance between second center point coordinates of a center point of a second region where each of the at least one second candidate character is located and the first touch point coordinates is calculated, and at least one second candidate character may be selected according to the corresponding calculated distance. Optionally, the top three characters with distance in an ascending order may be sequentially selected as the second candidate characters.

Because the number of the characters provided on the small soft keyboard is relatively small, the first area currently occupied by each of the candidate characters on the small soft keyboard may be larger than the second area occupied by each of the candidate characters on the soft keyboard. Thus, it is easy for the user to determine the target character on the small soft keyboard accurately.

Figure 11:
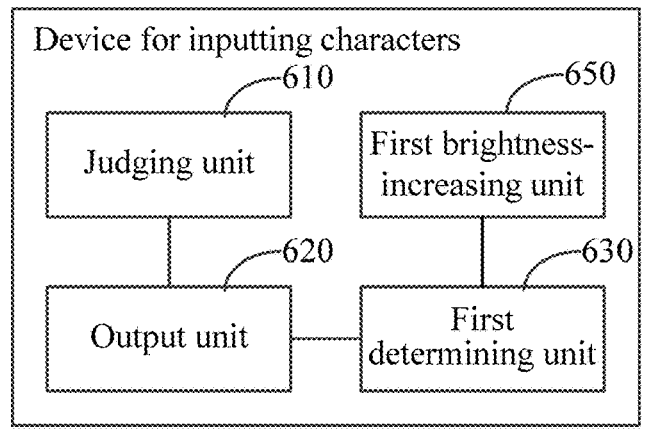
FIG. 11 is a block diagram showing another device for inputting characters according to an exemplary embodiment of the present disclosure.

FIG. 11 is a block diagram showing another device for inputting characters according to an exemplary embodiment of the present disclosure. On the basis of the embodiment shown in FIG. 10, the device in the embodiment in FIG. 11 further includes a first brightness-increasing unit 650.

The first brightness-increasing unit 650 is configured to increase a first brightness value of the first candidate character, while the first candidate character and the at least one second candidate character are output on the provided small soft keyboard.

In the above embodiment, the first candidate character is a character corresponding to the information of the first touch point, and is also most likely to serve as the target character. Thus, in an embodiment of the present disclosure, while a plurality of candidate characters are output on the small soft keyboard, the first brightness value of the first candidate character may be increased to highlight the first candidate character, and thereby user experience is improved.

Figure 12:
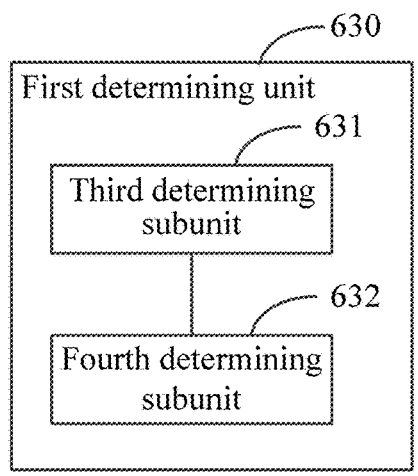
FIG. 12 is a block diagram showing another device for inputting characters according to an exemplary embodiment of the present disclosure.

FIG. 12 is a block diagram showing another device for inputting characters according to an exemplary embodiment of the present disclosure. On the basis of the embodiment shown in FIG. 6, the first determining unit 630 in the embodiment shown in FIG. 12 includes a third determining subunit 631 and a fourth determining subunit 632.

The third determining subunit 631 is configured to determine second touch point coordinates of a location where the second touch point is located, when the second touch is detected on the plurality of candidate characters.

The fourth determining subunit 632 is configured to determine the target character according to the second touch point coordinates. The second touch point is located within a target region where the target character is located from the plurality of candidate characters.

In the above embodiment, the user may tap the target character on the small soft keyboard directly. Because the area occupied by each character is increased on the small soft keyboard, the user can determine the target character more accurately, and thereby user experience is improved.

Figure 13:
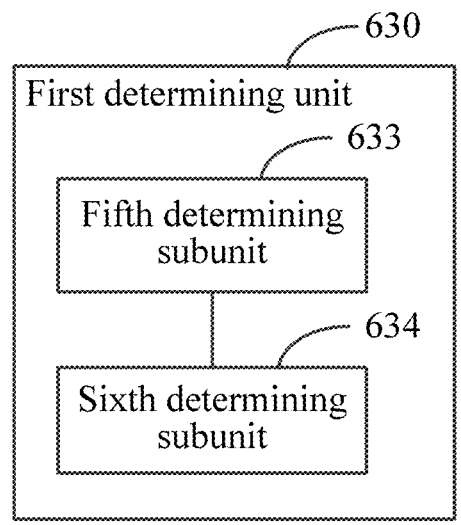
FIG. 13 is a block diagram showing another device for inputting characters according to an exemplary embodiment of the present disclosure.

FIG. 13 is a block diagram showing another device for inputting characters according to an exemplary embodiment of the present disclosure. On the basis of the embodiment shown in FIG. 6, the first determining unit 630 in the embodiment shown in FIG. 13 includes a fifth determining subunit 633 and a sixth determining subunit 634.

The fifth determining subunit 633 is configured to determine third touch point coordinates of a location where the last touch point in the consecutive touch points is located from the plurality of candidate characters, when the information of consecutive touch points is detected.

The sixth determining subunit 634 is configured to determine the target character according to the third touch point coordinates. The third touch point is located within a target region where the target character is located from the plurality of candidate characters.

In the above embodiment, when the information of consecutive touch points is detected by a terminal device, for example, the information of consecutive touch points generated when a stylus or a finger of the user of the terminal device is in contact with the touch screen and slides thereon, the information of the last touch point corresponds to the information of the touch point where the user lifts the finger or stylus. A character corresponding to the region where the third touch point coordinates of the location where the last touch point is located is determined as the target character. Thus, user experience is improved.

Figure 14:
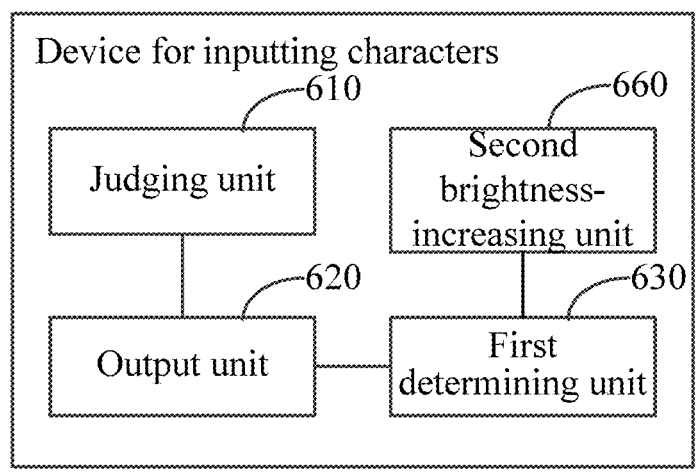
FIG. 14 is a block diagram showing another device for inputting characters according to an exemplary embodiment of the present disclosure.

FIG. 14 is a block diagram showing another device for inputting characters according to an exemplary embodiment of the present disclosure. On the basis of the embodiment shown in FIG. 13, the device in the embodiment in FIG. 14 further includes a second brightness-increasing unit 660.

The second brightness-increasing unit 660 is configured to increase a second brightness value of a character corresponding to the information of a current touch point in the consecutive touch points, among the plurality of candidate characters.

In the above embodiment, in order to allow the user to judge whether the current character corresponding to the touch operation is the target character more accurately, the current character is highlighted by increasing the second brightness value of the current character before receiving the ending instruction, and thereby user experience is also improved.

Figure 15:
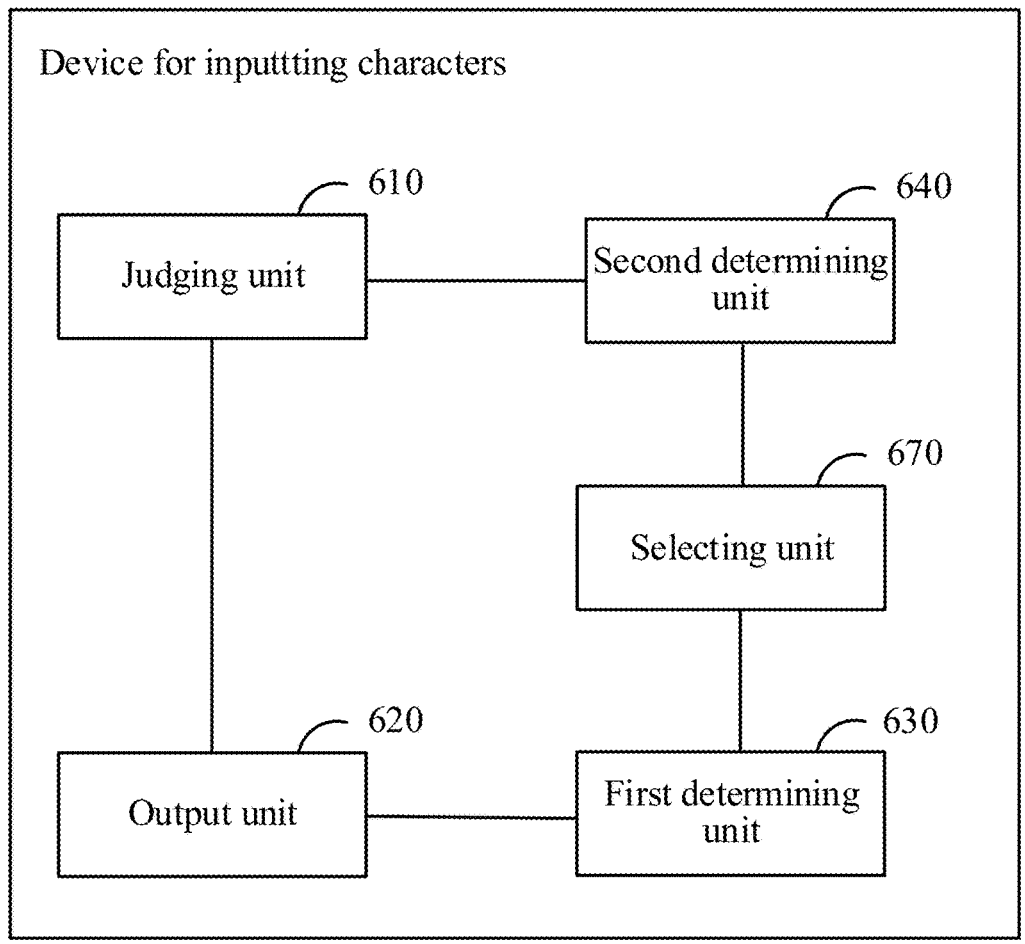
FIG. 15 is a block diagram showing another device for inputting characters according to an exemplary embodiment of the present disclosure.

FIG. 15 is a block diagram showing another device for inputting characters according to an exemplary embodiment of the present disclosure. On the basis of any one of the embodiments shown in FIGS. 6 to 14, the device in the embodiment in FIG. 15 further includes a selecting unit 670.

The selecting unit 670 is configured to select the target character on the soft keyboard.

For the method to realize the functions and roles of respective units in the above devices, refer to the above description regarding the corresponding steps in the methods. Detailed descriptions are omitted here.

The embodiments of devices basically correspond to the embodiments of methods, and thus the description about the embodiments of methods may be referred to for the related parts. The above described embodiments of devices are only illustrative, and the parts described as separated units may or may not be physically separated, and the parts shown as respective units may or may not be physical modules, i.e., the portions may be located at one place, or may be distributed over a plurality of network modules. A part or the whole of the units may be selected to realize the objective of the technical solutions of the present disclosure according to actual requirements. One with ordinary skill in this art may understand and practice the technical method of the present disclosure without exercising creative work.

Figure 16:
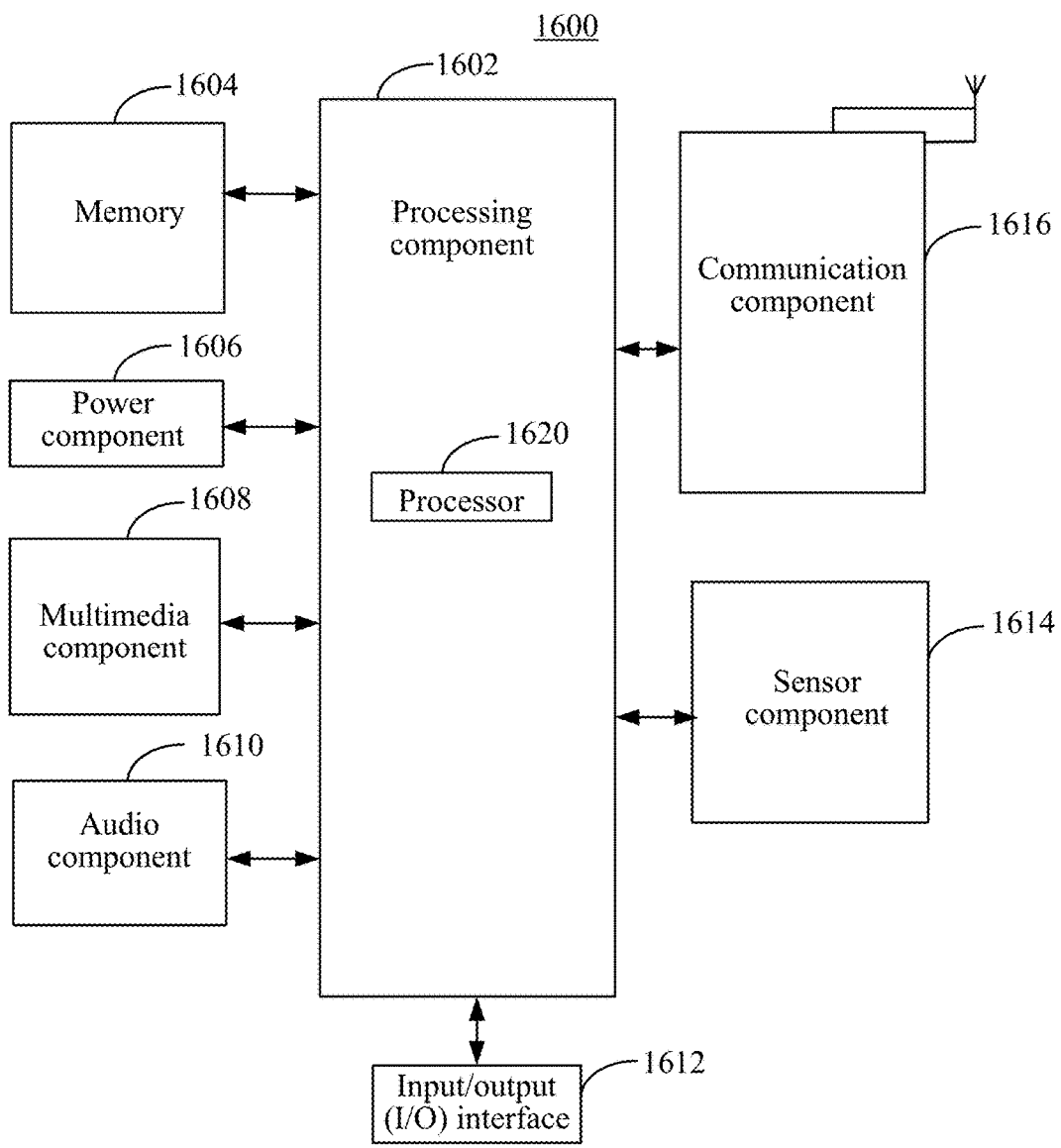
FIG. 16 is a block diagram showing a terminal device for inputting characters according to an exemplary embodiment of the present disclosure.

FIG. 16 is a block diagram showing a terminal device 1600 for inputting characters according to an exemplary embodiment of the present disclosure. For example, the device 1600 may be a terminal device with a touch screen, which may be a mobile phone, a computer, a digital broadcast terminal, a messaging device, a smart socket, a smart sphygmomanometer, a gaming console, a tablet, a medical device, an exercise equipment, a personal digital assistant, and the like.

Referring to FIG. 16, the device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the device 1600, such as the operations associated with display, telephone calls, data communications, camera operations, and recording operations. The processing component 1602 may include one or more processors 1620 to execute instructions to perform all or part of the steps in the methods described above. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the device 1600. Examples of such data include instructions for any applications or methods operated on the device 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the device 1600. The power component 1606 may include a power management system, one or more power sources, and any other components associated with the generation, management, and distribution of power in the device 1600.

The multimedia component 1608 includes a screen providing an output interface between the device 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and the rear camera may receive an external multimedia datum while the device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone ("MIC") configured to receive an external audio signal when the device 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, buttons, and the like. The buttons may include, but are not limited to, home buttons, volume buttons, starting buttons, and locking buttons.

The sensor component 1614 includes one or more sensors to provide status assessments of various aspects of the device 1600. For instance, the sensor component 1614 may detect an open/closed status of the device 1600, relative location of components, e.g., the display and the keypad, of the device 1600, a change in location of the device 1600 or a component of the device 1600, a presence or absence of user contact with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, a microwave sensor, or a temperature sensor.

The communication component 1616 is configured to facilitate wired or wireless communication between the device 1600 and other devices. The device 1600 can access a wireless network based on a communication standard, such as WiFi, 2G; or 3G; or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In exemplary embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the methods described above.

In exemplary embodiments, there is also provided a non-transitory computer-readable storage medium including instructions, such as included in the memory 1604, executable by the processor 1620 in the device 1600, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the invention disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for inputting characters, implemented by a terminal device with a touch screen, wherein the method comprises:

presenting a user interface on the touch screen, the user interface comprising a soft keyboard;

identifying a location of a first touch point upon detection of a first touch acted on the soft keyboard;

judging, based on the location of the first touch point, whether it is needed to select a plurality of candidate characters from the soft keyboard;

when it is needed to select the plurality of candidate characters, presenting the plurality of candidate characters on a currently provided user interface, wherein a first area occupied by each of the candidate characters on the currently provided user interface is larger than a second area occupied by each of the candidate characters on the soft keyboard; and determining a target character from the plurality of candidate characters;

wherein judging whether it is needed to select the plurality of candidate characters comprises:

calculating a set of first touch point coordinates, the first touch point coordinates indicating a location of the first touch point;

determining a first candidate character according to the first touch point coordinates, wherein the first candidate character represents a soft key which covers a first region where the first touch point is fallen on the soft keyboard;

judging whether a first distance between a center point of the first region and the first touch point exceeds a preset threshold; and when the first distance exceeds the preset threshold, determining that it is needed to select the plurality of candidate characters;

wherein determining the target character from the plurality of candidate characters comprises:

identifying a location of a last touch point among consecutive touch points upon detection of consecutive touches acted on the plurality of candidate characters through the currently provided user interface, wherein the last touch point is a touch point where an object for providing the consecutive touches is lifted; and determining the target character according to a location of the last touch point, wherein the target character represents a soft key which covers a target region where the last touch point is fallen on the currently provided user interface.

2. The method according to claim 1, further comprising:

when the first distance does not exceed the preset threshold, determining the first candidate character as the target character.

3. The method according to claim 1, wherein presenting the plurality of candidate characters on the currently provided candidate user interface comprises:

presenting the plurality of candidate characters on a provided small soft keyboard.

4. The method according to claim 3, wherein presenting the plurality of candidate characters on the provided small soft keyboard comprises:
determining at least one second candidate character based on at least one second distance in an ascending order, wherein each of the at least one second distance refers to a distance between a center point of a second region covered by each of the at least one second candidate character and the first touch point; and
presenting the first candidate character and the at least one second candidate character on the provided small soft keyboard.

5. The method according to claim 4, further comprising:
while presenting the first candidate character and the at least one second candidate character on the provided small soft keyboard, increasing a first brightness value of the first candidate character.

6. The method according to claim 1, wherein determining the target character from the plurality of candidate characters comprises:
identifying a location of a second touch point upon detection of a second touch acted on the plurality of candidate characters through the currently provided user interface; and
determining the target character according to a location of the second touch point, wherein the target character represents a soft key which covers a target region where the second touch point is fallen on the currently provided user interface.

7. The method according to claim 1, further comprising:
among the plurality of candidate characters, increasing a second brightness value of a character corresponding to a current touch point in the consecutive touch points.

8. The method according to claim 1, wherein after determining the target character from the plurality of candidate characters, the method further comprises:
presenting the target character in a text entry area as an inputted character.

9. A terminal device for inputting characters, comprising:
a processor;
a touch screen; and
a memory for storing instructions executable by the processor;
wherein the processor is configured to perform:
presenting a user interface on the touch screen, the user interface comprising a soft keyboard;
identifying a location of a first touch point upon detection of a first touch acted on the soft keyboard;
judging, based on the location of the first touch point, whether it is needed to select a plurality of candidate characters from the soft keyboard;
when it is needed to select the plurality of candidate characters, presenting the plurality of candidate characters on a currently provided user interface, wherein a first area occupied by each of the candidate characters on the currently provided user interface is larger than a second area occupied by each of the candidate characters on the soft keyboard; and
determining a target character from the plurality of candidate characters;
wherein judging whether it is needed to select the plurality of candidate characters comprises:
calculating a set of first touch point coordinates, the first touch point coordinates indicating a location of the first touch point;

determining a first candidate character according to the first touch point coordinates, wherein the first candidate character represents a soft key which covers a first region where the first touch point is fallen on the soft keyboard;
judging whether a first distance between a center point of the first region and the first touch point exceeds a preset threshold; and
when the first distance exceeds the preset threshold, determining that it is needed to select the plurality of candidate characters;
wherein determining the target character from the plurality of candidate characters comprises:
identifying a location of a last touch point among consecutive touch points upon detection of consecutive touches acted on the plurality of candidate characters through the currently provided user interface, wherein the last touch point is a touch point where an object for providing the consecutive touches is lifted; and
determining the target character according to a location of the last touch point, wherein the target character represents a soft key which covers a target region where the last touch point is fallen on the currently provided user interface.

10. The device according to claim 9, wherein the processor is further configured to perform:
when the first distance does not exceed the preset threshold, determining the first candidate character as the target character.

11. The device according to claim 9, wherein presenting the plurality of candidate characters on the currently provided candidate user interface comprises:
presenting the plurality of candidate characters on a provided small soft keyboard.

12. The device according to claim 11, wherein presenting the plurality of candidate characters on the provided small soft keyboard comprises:
determining at least one second candidate character based on at least one second distance in an ascending order, wherein each of the at least one second distance refers to a distance between a center point of a second region covered by each of the at least one second candidate character and the first touch point; and
presenting the first candidate character and the at least one second candidate character on the provided small soft keyboard.

13. The device according to claim 12, wherein the processor is further configured to perform:
while presenting the first candidate character and the at least one second candidate character on the provided small soft keyboard, increasing a first brightness value of the first candidate character.

14. The device according to claim 9, wherein determining the target character from the plurality of candidate characters comprises:
identifying a location of a second touch point upon detection of a second touch acted on the plurality of candidate characters through the currently provided user interface; and
determining the target character according to a location of the second touch point, wherein the target character represents a soft key which covers a target region where the second touch point is fallen on the currently provided user interface.

15. The device according to claim 9, wherein the processor is configured to further perform:

after determining the target character from the plurality of candidate characters, presenting the target character in a text entry area as an inputted character.

16. A non-transitory computer-readable storage medium having stored therein instructions that, when executed by a processor of a terminal device with a touch screen, cause the terminal device to perform a method for inputting characters, the method comprising:

presenting a user interface on the touch screen, the user interface comprising a soft keyboard;

identifying a location of a first touch point upon detection of a first touch acted on the soft keyboard;

judging, based on the location of the first touch point, whether it is needed to select a plurality of candidate characters from the soft keyboard;

when it is needed to select the plurality of candidate characters, presenting the plurality of candidate characters on a currently provided user interface, wherein a first area occupied by each of the candidate characters on the currently provided user interface is larger than a second area occupied by each of the candidate characters on the soft keyboard; and determining a target character from the plurality of candidate characters;

wherein judging whether it is needed to select the plurality of candidate characters comprises:

calculating a set of first touch point coordinates, the first touch point coordinates indicating a location of the first touch point;

determining a first candidate character according to the first touch point coordinates, wherein the first candidate character represents a soft key which covers a first region where the first touch point is fallen on the soft keyboard;

judging whether a first distance between a center point of the first region and the first touch point exceeds a preset threshold; and when the first distance exceeds the preset threshold, determining that it is needed to select the plurality of candidate characters;

wherein determining the target character from the plurality of candidate characters comprises:

identifying a location of a last touch point among consecutive touch points upon detection of consecutive touches acted on the plurality of candidate characters through the currently provided user interface, wherein the last touch point is a touch point where an object for providing the consecutive touches is lifted; and determining the target character according to a location of the last touch point, wherein the target character represents a soft key which covers a target region where the last touch point is fallen on the currently provided user interface.

* * * * *